United States Patent
Nam

(10) Patent No.: US 12,374,042 B2
(45) Date of Patent: Jul. 29, 2025

(54) METHOD FOR UPDATING 3-DIMENSIONAL MAP USING IMAGE, AND ELECTRONIC DEVICE FOR SUPPORTING SAME

(71) Applicant: Samsung Electronics Co., Ltd., Suwon-si (KR)

(72) Inventor: Sangbeom Nam, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 190 days.

(21) Appl. No.: 18/188,870

(22) Filed: Mar. 23, 2023

(65) Prior Publication Data

US 2023/0230318 A1 Jul. 20, 2023

Related U.S. Application Data

(63) Continuation of application No. PCT/KR2021/014147, filed on Oct. 13, 2021.

(30) Foreign Application Priority Data

Oct. 14, 2020 (KR) .......................... 10-2020-0132788

(51) Int. Cl.
G06T 17/05 (2011.01)
G06T 7/73 (2017.01)
(Continued)

(52) U.S. Cl.
CPC ............... *G06T 17/05* (2013.01); *G06T 7/74* (2017.01); *G06T 19/00* (2013.01); *G06V 10/761* (2022.01);
(Continued)

(58) Field of Classification Search
CPC ...... G06V 20/176; G06V 10/24; G06V 20/10; G06V 10/761; G06V 20/62; G06V 20/20;
(Continued)

(56) References Cited

U.S. PATENT DOCUMENTS 8,878,865 B2  11/2014  Altman et al.
9,437,033 B2   9/2016  Sun et al.
(Continued)

FOREIGN PATENT DOCUMENTS

JP      2001-143104 A   5/2001
KR  10-2004-0036832 A   5/2004
(Continued)

OTHER PUBLICATIONS

Hassner T, Basri R. Example based 3D reconstruction from single 2D images. In2006 Conference on Computer Vision and Pattern Recognition Workshop (CVPRW'06) Jun. 17, 2006 (pp. 15-15). IEEE.*

(Continued)

*Primary Examiner* — Phu K Nguyen
(74) *Attorney, Agent, or Firm* — Jefferson IP Law, LLP

(57) ABSTRACT

An electronic device is provided. The electronic device includes a camera module, a communication circuit, a memory, and a processor, wherein the processor may execute a first application using the camera module, obtain a first image through the camera module while the first application operates, recognize an object of a specified type in the first image, obtain location information of where the first image is obtained, determine a first virtual point corresponding to the location information on a three-dimensional (3D) virtual map, obtain a second image corresponding to the first image at the first virtual point, and update data of the 3D virtual map on the object based on a comparison between the first image and the second image.

19 Claims, 13 Drawing Sheets

(51) Int. Cl.
   *G06T 19/00* (2011.01)
   *G06V 10/74* (2022.01)
   *G06V 20/10* (2022.01)
   *G06V 20/62* (2022.01)
(52) U.S. Cl.
   CPC ............ *G06V 20/176* (2022.01); *G06V 20/62* (2022.01); *G06T 2200/24* (2013.01); *G06T 2207/20092* (2013.01); *G06T 2207/30184* (2013.01)
(58) Field of Classification Search
   CPC ......... G06T 17/05; G06T 19/20; G06T 19/00; G06T 7/74; G06T 11/60; G06T 2200/24; G06T 2219/2021; G06T 2207/30184; G06T 2207/20092
   USPC ........................................................ 345/418
   See application file for complete search history.

(56) References Cited

U.S. PATENT DOCUMENTS

| | | | |
|---|---|---|---|
| 10,074,214 | B2 | 9/2018 | La Fleur et al. |
| 10,140,769 | B2 | 11/2018 | Kim et al. |
| 10,482,674 | B1* | 11/2019 | Wu .................. G09B 25/00 |
| 10,593,104 | B2 | 3/2020 | Robert et al. |
| 11,106,328 | B1* | 8/2021 | Holland .............. G06F 21/6254 |
| 11,164,383 | B2 | 11/2021 | Min et al. |
| 11,288,837 | B2 | 3/2022 | Komissarov et al. |
| 11,417,069 | B1* | 8/2022 | Gupta .................... G06V 20/70 |
| 11,776,206 | B1* | 10/2023 | Gupta .................... G06T 17/05 345/419 |
| 2009/0096783 | A1* | 4/2009 | Shpunt .................... G02B 5/18 348/E13.001 |
| 2013/0069944 | A1 | 3/2013 | Altman et al. |
| 2014/0320593 | A1* | 10/2014 | Pirchheim ........... H04N 13/289 348/36 |
| 2015/0029182 | A1 | 1/2015 | Sun et al. |
| 2016/0148417 | A1 | 5/2016 | Kim et al. |
| 2016/0253839 | A1* | 9/2016 | Cole ...................... G09G 5/006 345/420 |
| 2017/0193331 | A1 | 7/2017 | La Fleur et al. |
| 2017/0193693 | A1 | 7/2017 | Robert et al. |
| 2018/0321776 | A1 | 11/2018 | Averyanov et al. |
| 2020/0279396 | A1 | 9/2020 | Komissarov et al. |
| 2021/0209853 | A1 | 7/2021 | Min et al. |
| 2021/0228286 | A1* | 7/2021 | Moghaddam .......... A61B 34/25 |
| 2022/0035439 | A1* | 2/2022 | Holland ................ G06F 3/0482 |

FOREIGN PATENT DOCUMENTS

| | | |
|---|---|---|
| KR | 10-2016-0062294 A | 6/2016 |
| KR | 10-1900759 B1 | 9/2018 |
| KR | 10-2004175 B1 | 7/2019 |
| KR | 10-2019-0117414 A | 10/2019 |
| KR | 10-2163774 B1 | 10/2020 |

OTHER PUBLICATIONS

Gutmann JS, Fukuchi M, Fujita M. A floor and obstacle height map for 3D navigation of a humanoid robot. InProceedings of the 2005 IEEE International Conference on Robotics and Automation Apr. 18, 2005 (pp. 1066-1071). IEEE.*

Aijazi AK, Checchin P, Trassoudaine L. Automatic removal of imperfections and change detection for accurate 3D urban cartography by classification and incremental updating. Remote Sensing. Jul. 30, 2013;5(8):3701-28.*

Taneja A, Ballan L, Pollefeys M. Geometric change detection in urban environments using images. IEEE transactions on pattern analysis and machine intelligence. Feb. 19, 2015;37(11):2193-206.*

International Search Report dated Feb. 10, 2022, issued in International Application No. PCT/KR2021/014147.

* cited by examiner

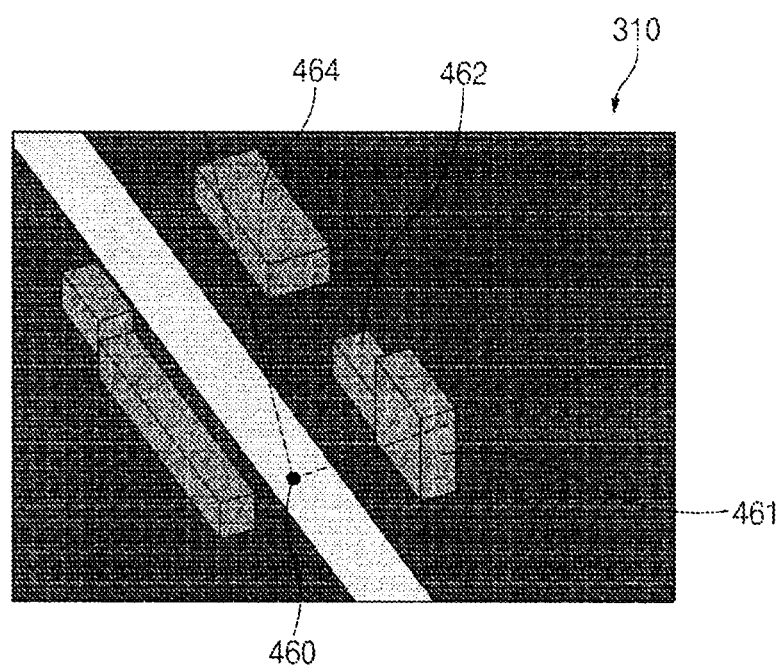
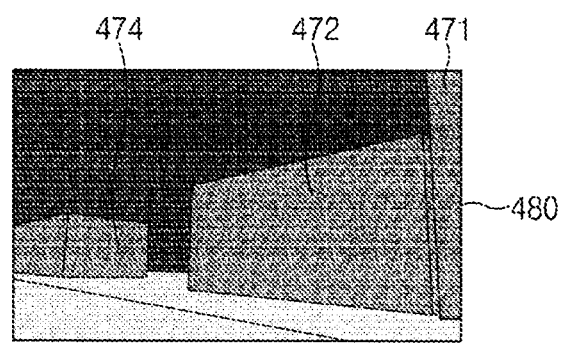
FIG.4B

1010

```
{ "type": "Feature", "properties": { "A0": 26820, "A1":
"1995205515784445308370000000", "A2": "1168010500101660003", "A3":
"1168010500", "A4": "SAMSEONG-DONG, GANGNAM-GU, SEOUL", "A5": "168-3", "A6":
"1", "A7": "NORMAL", "A8": "14000", "A9": "BUSINESS FACILITY", "A10": "42", "A11":
"STEEL-REINFORCED CONCRETE STRUCTURE", "A12": 884.61, "A13": "1995-03-30", "A14": 5301.65, "A15":
1792.2, "A16": 26.25, "A17": 49.36, "A18": 207.37, "A19": "14423", "A20": "N", "A21":
"B001000000WAHNO", "A22": "2019W/03W/07" }, "geometry": { "type": "MultiPolygon",
"coordinates": [ [ [ [ 127.06309769600861,  37.509683377292459 ],  [ 127.063006994470413,  37.509999707490493 ],
[ 127.062993407486571,  37.510023365738306 ],  [ 127.063045913966519,  37.510041637654453 ],
[ 127.063041316882988,  37.510049244464994 ],  [ 127.063198655054663,  37.510103492545532 ],
[ 127.063202270946412,  37.510961745314 23,  [ 127.063257513212605,  37.510115850509216 ],
[ 127.063329156083293,  37.509999535056487 ],  [ 127.063355616540392,  37.509933914693395 ],
[ 127.063108116075853,  37.509842818227888 ],
...
```

1020

| REQUEST BUILDING ID | REQUEST USER IDENTIFICATION NUMBER | REQUEST UPDATE HEIGHT (m) | REQUEST TYPE |
|---|---|---|---|
| 14423 | Eewr14cc62cc9931 | 32 | Auto |
| 14423 | ccde1423aa273931 | 34 | Auto |
| ... | | | |
| 14423 | Abif2873aacc6as3f | 31 | Auto |
| 23344 | Abif2873aacc6as3f | 220 | Manual |

FIG. 10

METHOD FOR UPDATING 3-DIMENSIONAL MAP USING IMAGE, AND ELECTRONIC DEVICE FOR SUPPORTING SAME

CROSS-REFERENCE TO RELATED APPLICATION(S)

This application is a continuation application, claiming priority under § 365(c), of an International application No. PCT/KR2021/014147, filed on Oct. 13, 2021 which is based on and claims the benefit of a Korean patent application number 10-2020-0132788, filed on Oct. 14, 2020, in the Korean Intellectual Property Office, the disclosure of each of which is incorporated by reference herein in its entirety.

BACKGROUND

1. Field

The disclosure relates to a method for updating a 3-dimensional (3D) map using an image and an electronic device for supporting the same.

2. Description of Related Art

An electronic device such as a smart phone and a tablet personal computer (PC) may perform various functions by using a camera. For example, the electronic device may provide an augmented reality (hereinafter referred to as AR) service in which an image is displayed on a display based on image data acquired using a camera and a virtual object is additionally displayed.

When an AR service is provided outdoors, an electronic device (e.g., a smart phone or smart glasses) is required to accurately recognize the current location and direction, and the shape and distance of surrounding structures (e.g., buildings).

The above information is presented as background information only to assist with an understanding of the disclosure. No determination has been made, and no assertion is made, as to whether any of the above might be applicable as prior art with regard to the disclosure.

SUMMARY

An electronic device may implement a 3D virtual map corresponding to real terrain or buildings. The electronic device may recognize a building based on an image captured by a camera. The electronic device may determine a virtual image having the same composition as the captured image on the 3D virtual map, and compare a building included in the virtual image with a building recognized from the captured image. Thus, the electronic device may accurately grasp current location information (e.g., latitude/longitude) or direction information (e.g., azimuth) and provide an AR service. In order to provide effective AR services, an electronic device may be required to increase the precision of a 3D virtual map and rapidly update the latest building information.

An electronic device or server may update a 3D virtual map in a scheme of scanning using a time-of-flight (ToF) sensor, a scheme of calculating and restoring depth using global positioning system (GPS) and image sensors, or a scheme of using satellite/aerial photography. In this case, the update cycle of the 3D virtual map may increase, and the cost for updating may increase. In addition, operations required to implement a 3D virtual map may increase.

Aspects of the disclosure are to address at least the above-mentioned problems and/or disadvantages and to provide at least the advantages described below. Accordingly, an aspect of the disclosure is to provide an electronic device for updating building information of a 3D virtual map by using an image obtained through a camera module.

Additional aspects will be set forth in part in the description which follows and, in part, will be apparent from the description, or may be learned by practice of the presented embodiments.

In accordance with an aspect of the disclosure, an electronic device is provided. The electronic device includes a camera module, a communication circuit, a memory, and a processor, wherein the processor may execute a first application using the camera module, obtain a first image through the camera module while the first application operates, recognize an object of a specified type in the first image, obtain location information of where the first image is obtained, determine a first virtual point corresponding to the location information on a three-dimensional (3D) virtual map, obtain a second image corresponding to the first image at the first virtual point, and update data of the 3D virtual map on the object based on a comparison between the first image and the second image.

According to various embodiments of the disclosure, the electronic device may update a 3D virtual map corresponding to an actual terrain or buildings based on an image captured by a camera module of the electronic device.

According to various embodiments of the disclosure, the electronic device may update a 3D virtual map by using an image captured while using an AR application. Thus, terminals of other users may support realistic AR services by using an updated 3D virtual map.

According to various embodiments of the disclosure, the electronic device may extract text from an image and update a 3D virtual map by using the extracted information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4B is a diagram illustrating the acquisition of a virtual image according to an embodiment of the disclosure;

FIG. 10 is a diagram illustrating a text-type database of a 3D virtual map according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
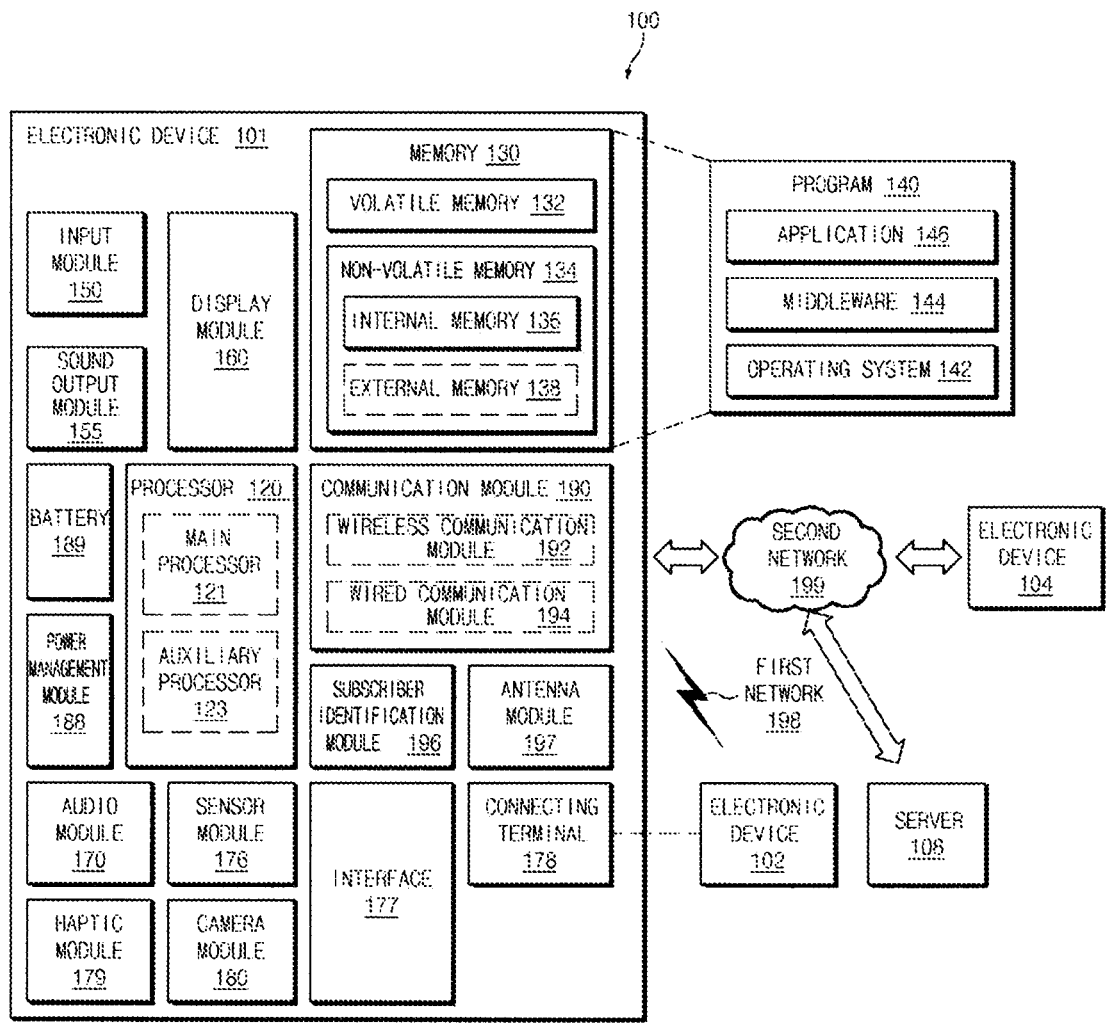
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
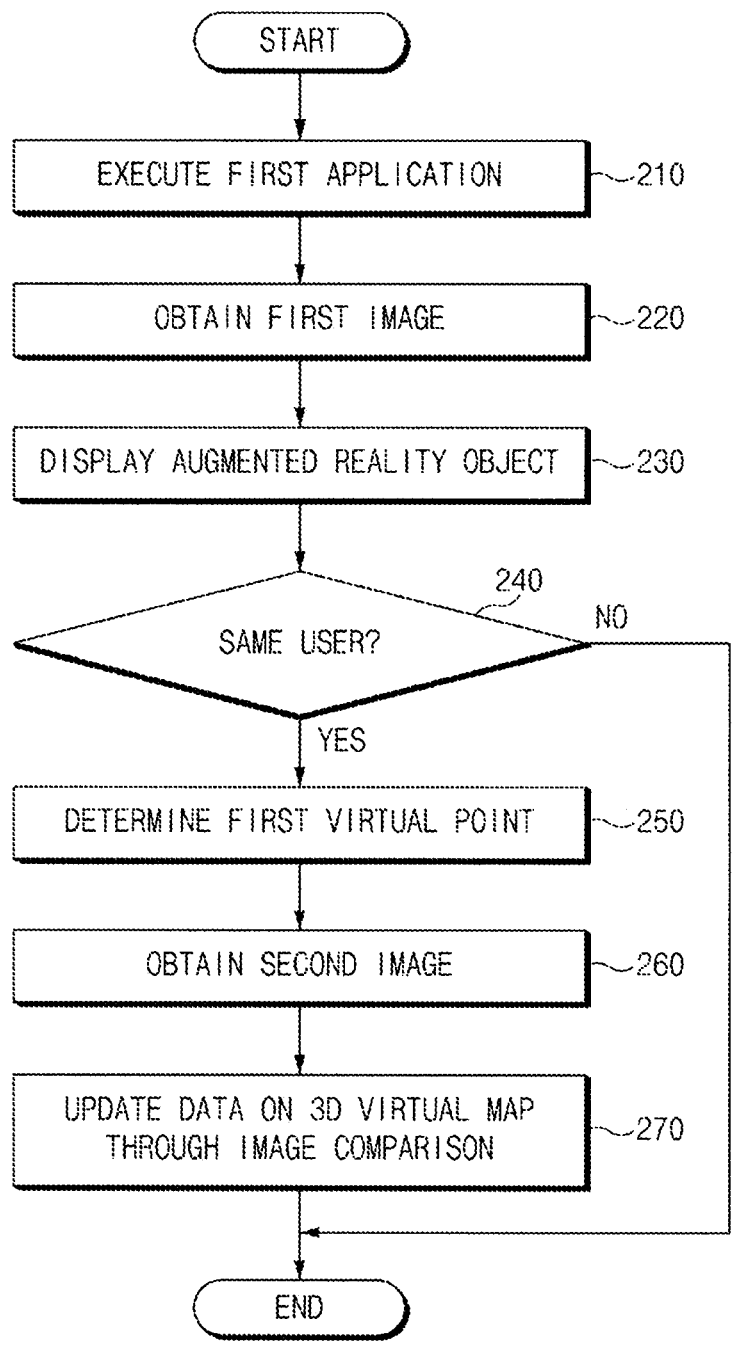
FIG. 2 is a flowchart illustrating a method for updating a 3D virtual map using an image according to an embodiment of the disclosure.

FIG. 2 is a flowchart illustrating a method for updating a 3D virtual map using an image according to an embodiment of the disclosure.

Referring to FIG. 2, in operation 210, a processor (e.g., the processor 120 of FIG. 1) may execute a first application. The first application may be an application for providing an augmented reality (AR) service. The processor 120 may execute the first application (hereinafter, referred to as an AR application) and display an AR object or additional information (e.g., an image or text) on a real-time image displayed on a display.

According to various embodiments, when an AR application is executed, the processor 120 may detect a user state or a state of the electronic device 101 by using various sensors of the sensor module 176. For example, the processor 120 may activate an inertial sensor (e.g., an accelerometer, gyroscope, and/or magnetometer) and/or a geomagnetic sensor when the AR application is executed. Alternatively, when the AR application is executed, the processor 120 may activate a sensor that is in an inactive state among at least one sensor used for the operation of the AR application among various sensors included in the sensor module 176.

According to various embodiments, the processor 120 may obtain location information (e.g., latitude/longitude) of the electronic device 101 through the wireless communication module 192. For example, the wireless communication module 192 may receive location information from a base station included in a global navigation satellite system (GNSS) (e.g., global positioning system (GPS)) and/or a cellular network (e.g., the second network 199 of FIG. 1).

In operation 220, the processor 120 may obtain a first image through a camera module (e.g., the camera module 180 of FIG. 1) while the AR application operates. For example, the first image may be an image displayed in real time through the display module 160 while the AR application operates.

In operation 230, the processor 120 may display an augmented reality object by using the first image. For example, the processor 120 may recognize an object (e.g., a building, a person, or a tree) in the first image. The processor 120 may determine an AR object displayed together with the first image and determine a location of the AR object. The processor 120 may detect movement of the electronic device 101 or the user through the sensor module 176 and change the shape or location of the AR object corresponding to the detected sensing information.

According to various embodiments, the processor 120 may provide an AR service by using a 3D virtual map. For example, a 3D virtual map may be a map generated by rendering based on textual information such as elevation data (e.g., maximum height above sea level) and/or artificial structure data (e.g., shape and height of the land), rather than actual captured images.

According to various embodiments, the processor 120 may determine a point (hereinafter, a first virtual point) on a 3D virtual map corresponding to location information (e.g., latitude/longitude) of the electronic device 101. The processor 120 may obtain virtual images of various angles by disposing a virtual camera having the same characteristics and/or setting information as the camera module 180 at the first virtual point. The processor 120 may determine the exact location or direction of the electronic device 101 by comparing the actual captured image with the virtual images.

According to an embodiment, the virtual camera may be a virtual object that determines a viewpoint and/or an angle of view at the first virtual point. For example, the virtual camera may have the same characteristics and/or setting information as the camera module 180. The viewpoint determined by the virtual camera may be determined based on at least one of a type of lens, an angle of view, a zoom magnification, pixels, and brightness of the camera module 180. For example, the virtual camera may be a virtual object generated by executing software. The virtual camera may obtain a virtual image at the determined first virtual point.

According to various embodiments, the processor 120 may determine information (e.g., distance or depth) of a virtual building adjacent to the first virtual point. The processor 120 may provide an AR service by determining a distance or depth from a real building corresponding to the virtual building based on information about the virtual building. For example, the processor 120 may adjust the size or location of the AR object according to the distance from the real building. In addition, the processor 120 may represent a part of the AR object to be occluded by a real building according to the depth (occlusion).

According to various embodiments, in operation 240, the processor 120 may determine whether a user agrees to provide information for updating the 3D virtual map. For example, when installing or executing an AR application, the processor 120 may receive an input related to user consent by displaying a pop-up window for user consent.

According to various embodiments, when the user does not agree (No), the following operation related to updating the 3D virtual map may not be performed.

In operation 250, when the user agrees (Yes), the processor 120 determines a first virtual point corresponding to location information at which the first image (hereinafter, a real image) is captured in the 3D virtual map.

In operation 260, the processor 120 may obtain a second image (hereinafter referred to as a virtual image) corresponding to the real image at the first virtual point. For example, the processor 120 may obtain a plurality of virtual images at every specified distance (e.g., 1 m) while rotating at a specified angular interval (e.g., about 5 degrees) from the first virtual point, and may select one virtual image from the plurality of virtual images by comparing feature points (or feature vectors) with real images. According to an embodiment, the virtual image is not limited to image-type data. For example, the virtual image may be text-type data including building-related information (e.g., building area, building shape, and building edge information).

According to various embodiments, the processor 120 may obtain a virtual image by equally applying characteristics (e.g., lens type) or setting information (e.g., zoom magnification) of the camera module 180 to a virtual camera.

In operation 270, the processor 120 may compare the real image with the virtual image, and update data of a 3D virtual map (or object information, building information, and map data) for an object (e.g., building height) included in the real image.

According to various embodiments, the processor 120 may identify a first update condition regarding the number or ratio of matched objects by comparing the real image with the virtual image.

According to an embodiment, the processor 120 may determine whether the ratio (hereinafter, referred to as a matching ratio) of the number of virtual buildings (see FIG. 5) matched with the real image to the number of virtual buildings observable at the first virtual point is equal to or greater than (or exceeds) a specified first reference value (first update condition). The first reference value $\alpha$ may be set to a value between '0' and '1'.

For example, when the ratio M/N of the number N of virtual buildings observable at the first virtual point to the number M of matched virtual buildings is equal to or greater than (or exceeds) the first reference value $\alpha$, the server 108 may perform an update. In this case, N*$\alpha$ buildings or more may be observed through a virtual camera on the 3D virtual map, and N*(1−$\alpha$) buildings may be omitted or have different heights on the 3D virtual map.

According to various embodiments, when the matching ratio is less than (or equal to or less than) the first reference value $\alpha$, because incorrect building information may be reflected on the 3D virtual map, the processor 120 mays not proceed with the update.

According to various embodiments, the processor 120 may identify a second update condition related to text recognized from a real image. The processor 120 may recognize the text included in the real image (e.g., an optical character reader (OCR)). When the recognized text is recognized as at least a part of a business name (e.g., signboard) or address (e.g., street number, road name, country branch number) and matches building information around the first virtual point, the processor 120 may set a second reference value $\beta$ related to matching between recognized text and building information. The second reference value $\beta$ may be smaller than the first reference value $\alpha$.

According to various embodiments, the processor 120 may determine a virtual building that is required to be updated through comparison between the real image and the virtual image (see FIG. 5), and generate a virtual building or change the height of the virtual building to correspond to the real building (see FIGS. 6 to 10).

According to various embodiments, at least a part of the operation of the processor 120 in FIG. 2 may be performed through a server (the server 108 of FIG. 1).

Figure 3:
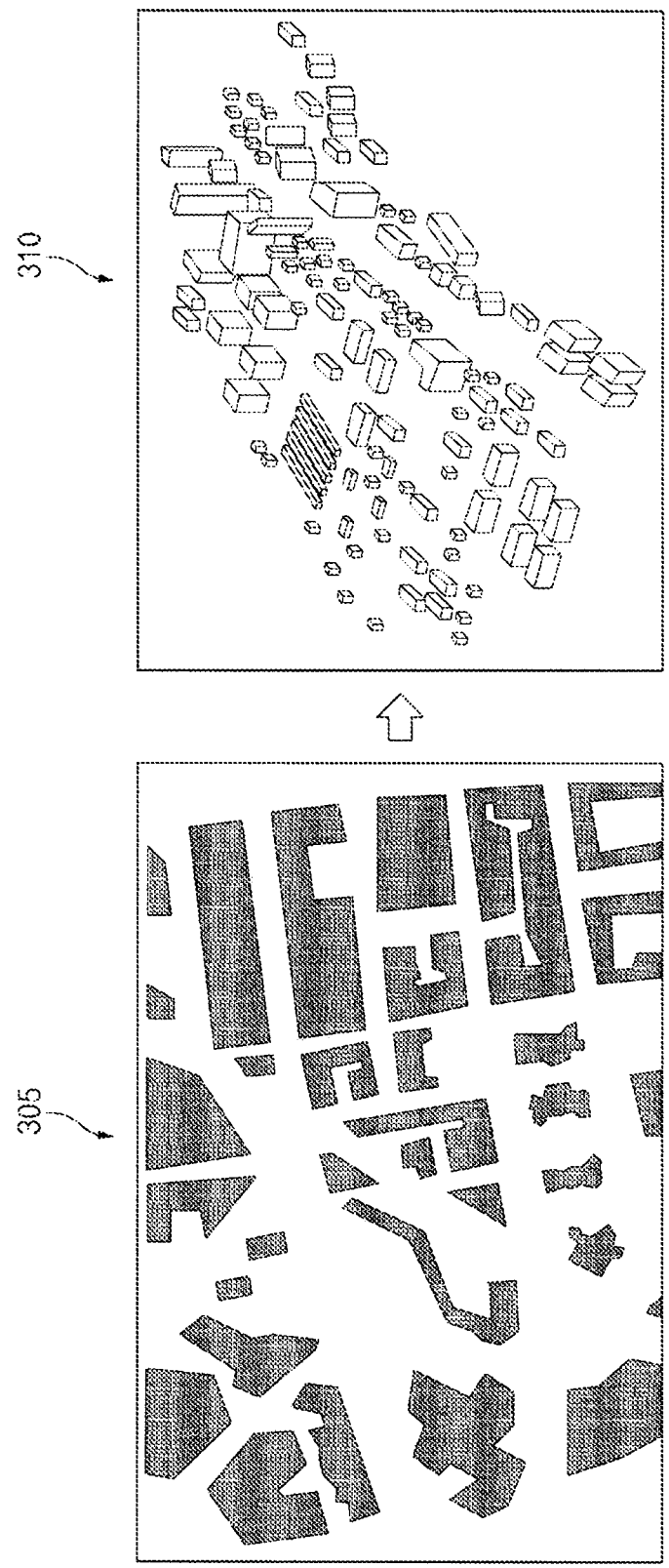
FIG. 3 is a diagram illustrating the generation of a 3D virtual map according to an embodiment of the disclosure.

FIG. 3 is a diagram illustrating the generation of a 3D virtual map according to an embodiment of the disclosure.

Referring to FIG. 3, the processor 120 or the server 108 may generate a 3D virtual map 310. The 3D virtual map 310 may be generated based on a two-dimensional (2D) map 305. The 2D map 305 may display data indicating an area (e.g., horizontal and vertical, cross-sectional view) of the ground where the building is arranged.

The processor 120 or the server 108 may add height information to the building included in a 2D map 305 such that the building is extruded as high as the height from the floor thereof, thereby rendering the buildings of the 3D virtual map 310.

According to various embodiments, the 3D virtual map 310 may not include information about detailed shapes or colors of facilities and/or buildings. For example, all buildings included in the 3D virtual map 310 may have the same type of figure (e.g., a rectangular parallelepiped), a shape similar to the shape of the land, or a simplified shape of the facility and/or building, and may be rendered to have different sizes and/or heights based on text information.

Figure 4A:
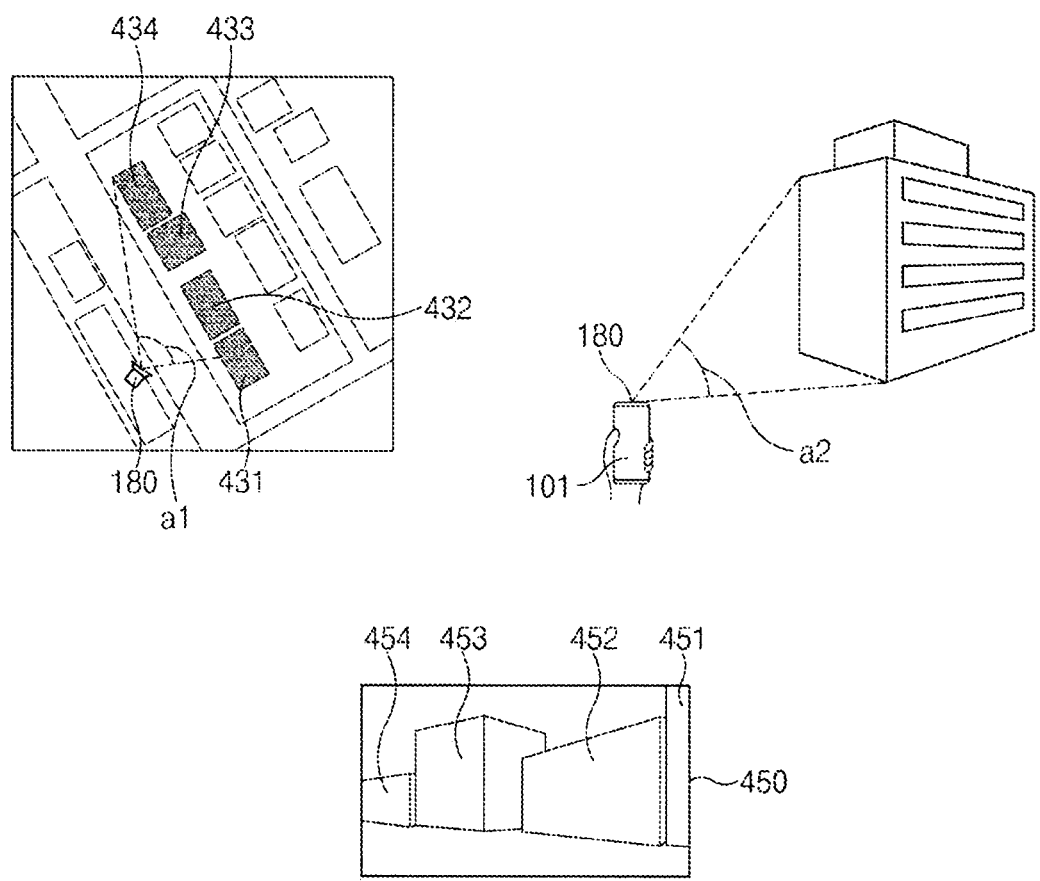
FIG. 4A is a diagram illustrating the acquisition of a real image using a camera module according to an embodiment of the disclosure.

FIG. 4A is a diagram illustrating the acquisition of a real image using a camera module according to an embodiment of the disclosure.

Referring to FIG. 4A, the processor 120 may obtain a real image 450 while the AR application operates. For example, the real image may be an image captured through a camera module (or camera, imaging device) of the electronic device 101 (e.g., the camera module 180 of FIG. 1).

For example, when the camera module 180 has a horizontal angle of view a1 and a vertical angle of view a2, the captured real images 450 may include first to fourth building areas 451, 452, 453, and 454 corresponding to all or some of first to fourth buildings 431, 432, 433, and 434.

According to various embodiments, when capturing the real image 450, the processor 120 may collect location information (e.g., latitude/longitude) and/or direction information (e.g., latitude/longitude) of the current location of the electronic device 101. The location information and/or direction information may be used to determine a virtual image corresponding to the real image 450.

FIG. 4B is a diagram illustrating the acquisition of a virtual image according to an embodiment of the disclosure.

Referring to FIG. 4B, the processor 120 or the server 108 may determine a first virtual point 460 on the 3D virtual map 310 corresponding to location information (e.g., latitude/longitude), at which a real image (e.g., the real image 450 of FIG. 4A) is captured.

The processor 120 or the server 108 may arrange a virtual camera having the same characteristics and/or setting information as the camera module 180 at the first virtual point 460. The processor 120 or the server 108 may obtain a virtual image 480 by arranging the virtual camera in the direction in which the real image 450 is captured. According to an embodiment, the processor 120 or the server 108 may obtain a plurality of virtual images while rotating at a specified angular interval (e.g., about 5 degrees) from the first virtual point 460, and may select one virtual image 480 from the plurality of virtual images by comparing feature points (or feature vectors) with the real image 450.

According to an embodiment, the virtual image 480 is not limited to image-type data. For example, the virtual image 480 may be text-type data including building-related information (e.g., building area, building shape, and building edge information).

According to various embodiments, an arrangement area of an object (e.g., a building) included in the real image 450 may not coincide with an arrangement area of a virtual object included in the virtual image 480.

For example, the real image 450 of FIG. 4A includes the first to fourth building areas 451 to 454 corresponding to all or some of the first to fourth buildings 431 to 434. To the contrary, the 3D virtual map 310 may include a first virtual building 461, a second virtual building 462, and a fourth virtual building 464, and may not include a virtual building corresponding to the third building 433. In this case, the virtual image 480 may include a first virtual building area 471, a second virtual building area 472 and a fourth virtual building area 454 that correspond to the first virtual building 461, the second virtual building 462 and the fourth virtual building 464, respectively, and a virtual building area corresponding to the third building 433 may be omitted therefrom.

FIG. 4B illustrates a case where a virtual building is omitted as an example, but the embodiment is not limited thereto. For example, the virtual buildings in the 3D virtual map 310 may not have any heights or may have different heights.

According to various embodiments, the processor 120 or the server 108 may compare the real image 450 and the virtual image 480 to update information about buildings of which heights are omitted or different from each other (see FIGS. 5 to 10).

Figure 5:
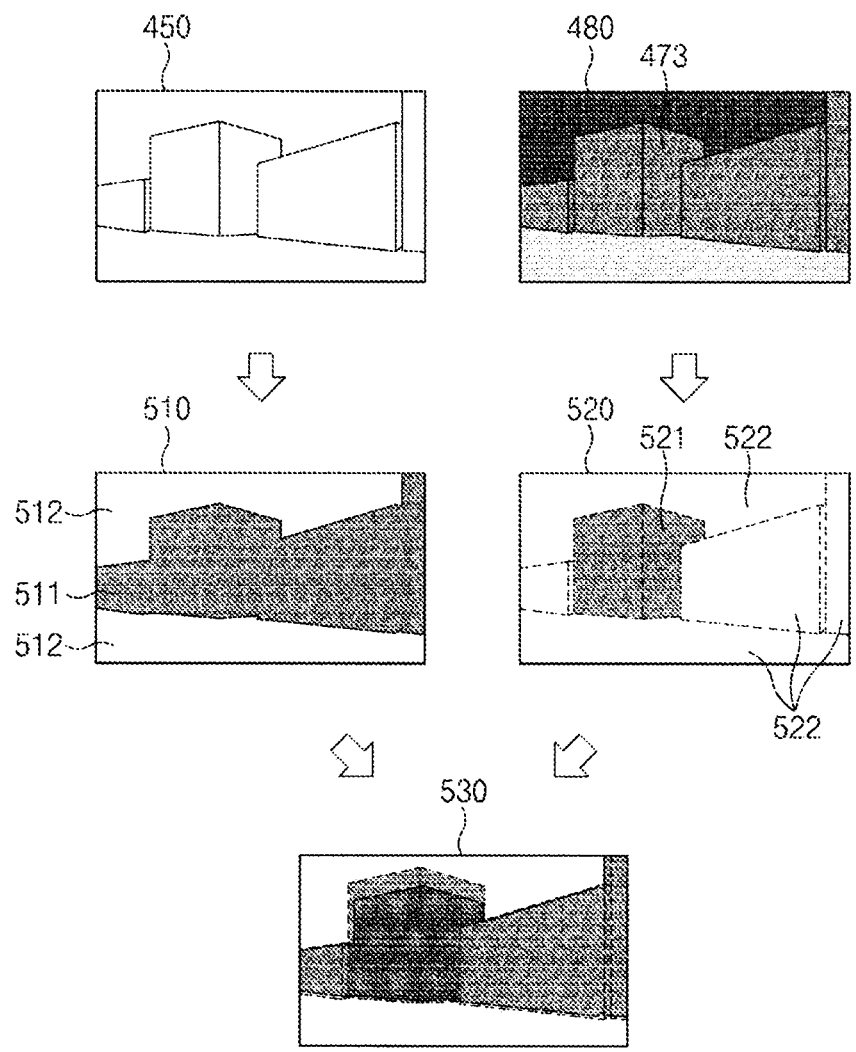
FIG. 5 is a diagram illustrating matching between a real image and a virtual image according to an embodiment of the disclosure.

FIG. 5 is a diagram illustrating matching between a real image and a virtual image according to an embodiment of the disclosure.

Referring to FIG. 5, the processor 120 or the server 108 may recognize an object included in the real image 450. The processor 120 or the server 108 may recognize a terrain feature (e.g., the sky, a building, or a road) in the real image 450. For example, the processor 120 or the server 108 may determine a building area, a sky area, and/or a road area in the real image 450.

According to various embodiments, the processor 120 may generate a first mask image (or a first binary mask (M_real)) 510 in which the pixel value of a building area 511 among the recognized terrain features is '1' and the pixel value of the remaining areas (e.g., a sky area or a road area) 512 is '0'. According to an embodiment, the first binary mask (M_real) 510 is not limited to image-type data. For example, the first binary mask (M_real) 510 may be text-type data.

According to various embodiments, the processor 120 or the server 108 may obtain the virtual image 480 corresponding to the real image 450.

The processor 120 or the server 108 the processor 120 may generate a second mask image (or a second binary mask (M_virtual)) 520 in which the pixel value of an area 521 corresponding to one virtual building (hereinafter, referred to as a matching target building) 473 is '1' and the pixel value of the remaining areas 522 is '0'. According to an embodiment, the second binary mask (M_virtual) 520 is not limited to image-type data. For example, the second binary mask (M_virtual) 520 may be text-type data.

The second mask image 520 may be extracted from the 3D virtual map 310 that is generated based on text information (e.g., land shape, height) about each building, and may be separated for each virtual building by pixel to set a pixel value. In the second mask image 520, the area 521 where the matching target building 473 is placed has a pixel value of '1', and an area without a building (e.g., a road area or sky area) or an area 522 where another virtual building is placed may have a pixel value of '0'.

According to various embodiments, the processor 120 may generate an overlap image (M_overlap) 530 based on the first mask image 510 and the second mask image 520. According to an embodiment, the overlap image (M_overlap) 530 is not limited to image-type data. For example, the overlap image (M_overlap) 530 may be text-type data.

For example, the overlap image (M_overlap) 530 may be an image in which that a pixel value of an area is represented as '1' where the area is represented as '1' in both the first mask image 510 and the second mask image 520 by performing an AND operation on the first mask image 510 and the second mask image 520. In the overlap image (M_overlap) 530, the area where the matching target building and the real building are arranged may have a pixel value of '1', and the area where a building is omitted or the heights of buildings are different, and there is no building (a matching target building or real building) (e.g., a sky area) may have a pixel value of '0'.

According to various embodiments, the processor 120 may determine that the matching target building matches the real building when the ratio S of the number of pixels that are '1' in the overlap image 530 to the number of pixels that are '1' in the second mask image (M_virtual) 520 in the overlap image 530 is equal to or greater than (or exceeds) the matching reference value δ. For example, the processor 120 may determine whether the matching target building matches the real building by using the following Equation 1.

$$IsMatched = \begin{cases} True, & S > \delta \\ False, & otherwise \end{cases} \quad \text{Equation 1}$$

$$\text{where,} \quad M_{overlap} = M_{real} \cap M_{virtual}, \; S = \frac{\Sigma M_{overlap}}{\Sigma M_{virtual}}$$

Figure 6:
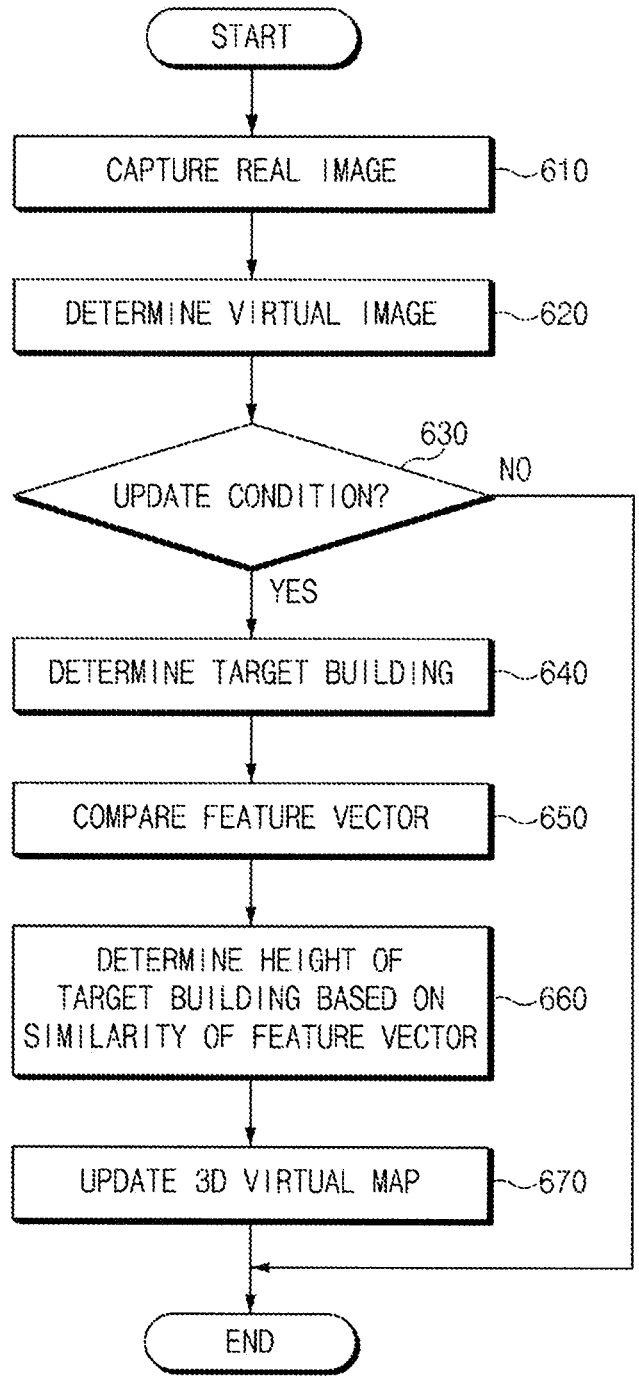
FIG. 6 is a flowchart illustrating a process of updating the height of a virtual building according to an embodiment of the disclosure.

FIG. 6 is a flowchart illustrating a process of updating the height of a virtual building according to an embodiment of the disclosure.

Referring to FIG. 6, in operation 610, the processor 120 may capture a real image (e.g., the real image 450 of FIG. 4A) by using the camera module 180.

In operation 620, the processor 120 or the server 108 may determine a virtual image (e.g., the virtual image 480 of FIG. 4B) corresponding to a real image by using information on the location where the real image 450 was captured. According to an embodiment, the virtual image is not limited to image-type data. For example, the virtual image may be text-type data including information on a building (e.g., information on a building area, a building shape, and a building edge).

In operation 630, the processor 120 or the server 108 may identify an update condition (e.g., a first update condition or a second update condition). For example, the first update condition may be a condition related to the number or ratio of matched objects by comparing the real image with the virtual image. The second update condition may be a condition related to text recognized in a real image (see FIG. 2).

According to an embodiment, the processor 120 or the server 108 may not proceed with a separate update when the update condition is not satisfied (No).

In operation 640, when the update condition is satisfied (Yes), the processor 120 or the server 108 may determine a virtual building (hereinafter, a target building) requiring an update. The processor 120 may determine a building less than (or equal to or less than) the matching reference value δ among the matching target buildings as the target building.

According to various embodiments, when there is no virtual building corresponding to the 3D virtual map 310 among objects recognized in the real image 450, the processor 120 may determine a virtual point (hereinafter, referred to as a target point) requiring updating. The processor 120 may generate a virtual building at a target point when a plurality of real images having different location information related to the target point is collected.

When a real building is photographed at various angles around the target point and data is accumulated at a degree sufficient to generate a virtual building corresponding to the omitted real building, the processor 120 or the server 108 may use 3D reconstruction technology to determine the location, shape or height of the virtual building.

In operation 650, the processor 120 or the server 108 may compare the first feature vector of the real image and the second feature vector of the virtual image. The feature vector may be text data converted into a one-dimensional vector by masking an area other than a building in each real or virtual image (see FIG. 7).

In operation 660, the processor 120 or the server 108 may determine the height of the target building based on the similarity between the first feature vector and the second feature vector. The processor 120 or the server 108 may repeatedly compare similarities of feature vectors by changing the height of the target building. The processor 120 or the server 108 may determine a height at which the similarity between the first feature vector and the second feature vector is equal to or greater than a specified value or maximum.

In operation 670, the processor 120 or the server 108 may update the 3D virtual map by storing the height of the target building. Data on the 3D virtual map may be in a text type, and the processor 120 or the server 108 may change an item corresponding to the height among the text-type data.

Figure 7:
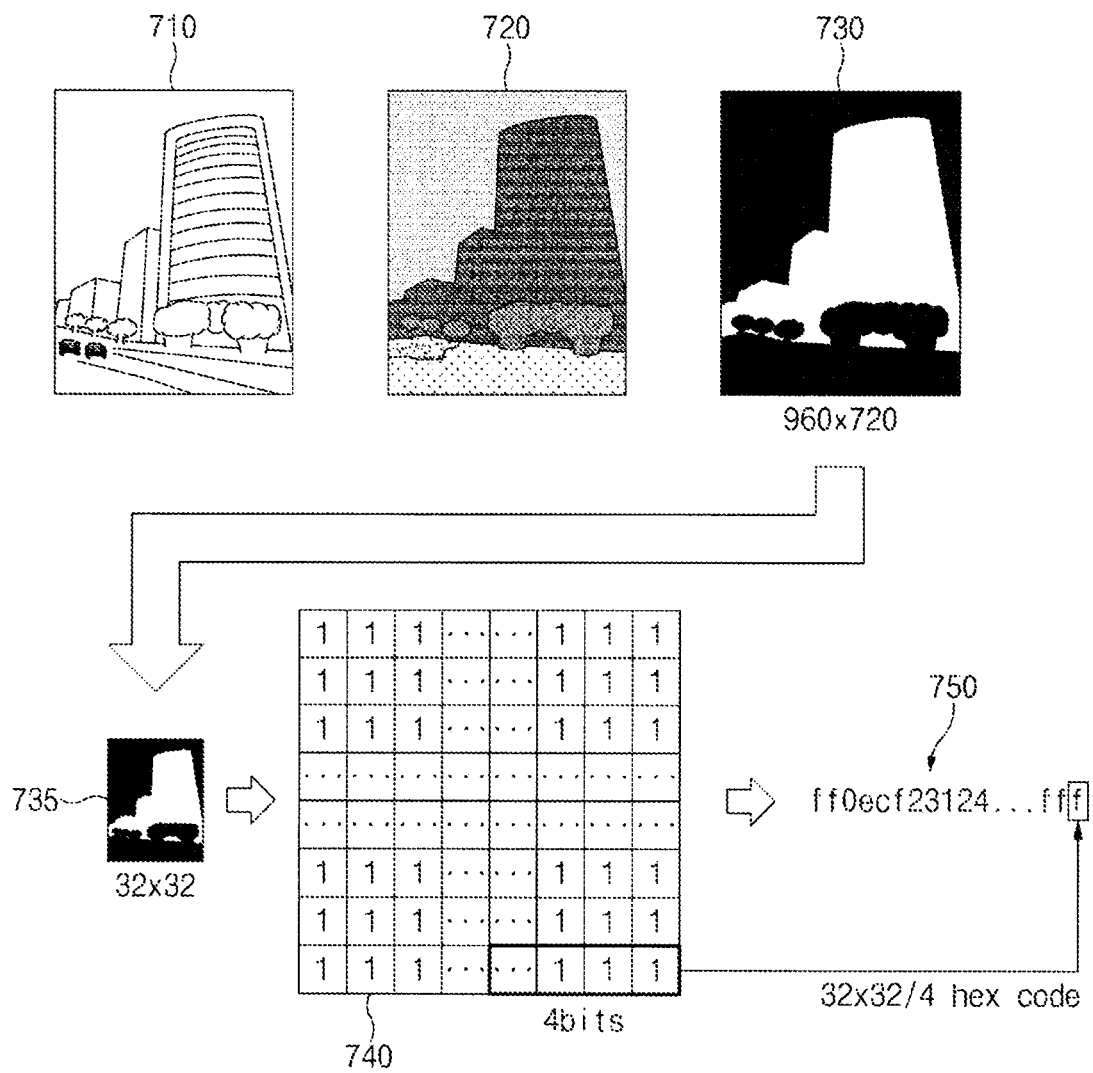
FIG. 7 is a diagram illustrating the generation of a feature vector for a real image according to an embodiment of the disclosure.

FIG. 7 is a diagram illustrating the generation of a feature vector for a real image according to an embodiment of the disclosure.

Referring to FIG. 7, the processor 120 may capture a real image 710 by using the camera module 180. The processor 120 may generate a feature image 720 by recognizing and classifying a designated object using an object recognition algorithm (e.g., semantic segmentation). According to one embodiment, the feature image 720 is not limited to image-type data. For example, the feature image 720 may be text-type data.

The processor 120 may generate a first mask image 730 in which an area (e.g., a building area) occupied by a specified object in the feature image 720 is represented as a first value (e.g., '1'), and the remaining area is represented as a second value (e.g., '0'). According to an embodiment, the first mask image 730 is not limited to image-type data. For example, the first mask image 730 may be text-type data.

The processor 120 may generate a second mask image 735 obtained by converting the first mask image 730 to a specified ratio or size. For example, the second mask image 735 of 32*32 may be generated by reducing the first mask image 730 of 960*720 and converting the horizontal/vertical ratio.

According to an embodiment, the second mask image 735 is not limited to image-type data. For example, the second mask image 735 may be text-type data.

The processor 120 may convert the second mask image 735 into a one-dimensional feature vector 750. The processor 120 may extract binary data 740 from the second mask image 735, and may generate and arrange hex codes in units of 4 pixels (bits), thereby generating the feature vector 750.

Figure 8:
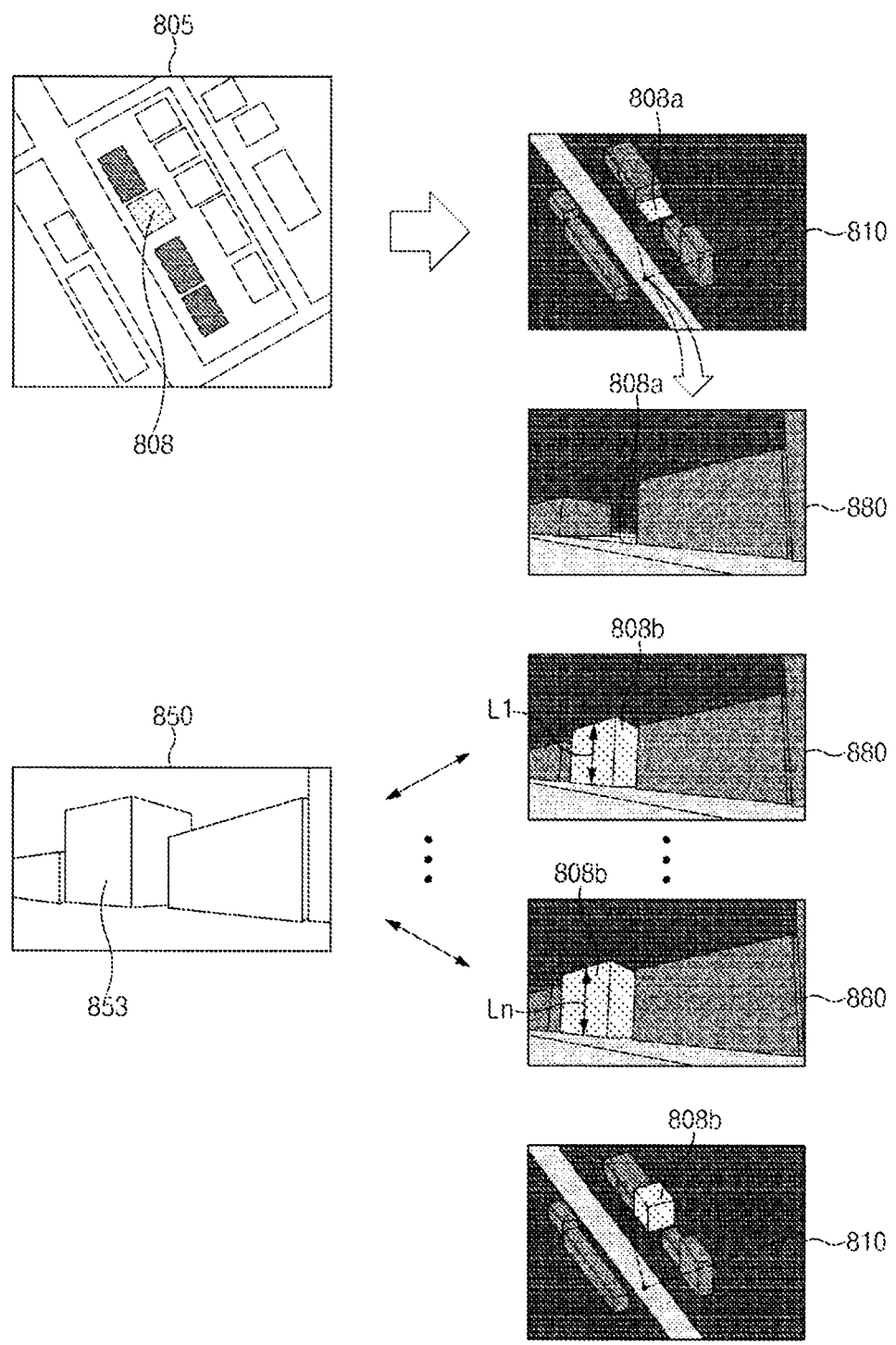
FIG. 8 is a diagram illustrating an update when the height of a target building is omitted according to an embodiment of the disclosure.

FIG. 8 is a diagram illustrating an update when the height of a target building is omitted according to an embodiment of the disclosure.

Referring to FIG. 8, the processor 120 or the server 108 may generate a 3D virtual map 810 based on a 2D map 805. The 2D map 805 may include data indicating an area (e.g., horizontal and vertical, or cross-sectional view) of the ground where the building is arranged. The processor 120 or the server 108 renders the building of the 3D virtual map 810 by adding height information to the building included in the 2D map 805 so that the building rises as high as the height from the floor of the building.

According to various embodiments, the 2D map 805 may include a cross section (polygon) 808 of a building having no height information among building sites. In this case, the 3D virtual map 810 may include a building area 808*a* corresponding to the polygon 808 of the building, and may not generate a separate virtual building in the building area 808*a*.

According to various embodiments, the processor 120 or the server 108 may obtain a real image 850 including a real building area 853 corresponding to the building area 808*a*. Through a matching process (see FIG. 5), the processor 120 or the server 108 may determine a virtual building corresponding to the real building area 853 as a target building (e.g., a virtual building having a matching reference value or less), which is required to be updated.

According to various embodiments, the processor 120 or the server 108 may generate a virtual building 808*b* having a first height L1 in the building area 808*a* without a virtual building. For example, the first height L1 may be determined by basic settings or through comparison with other virtual buildings in the vicinity. For another example, the first height L1 may be set to an infinite value.

The processor 120 or the server 108 may compare a feature vector of the real image 850 and a feature vector of a virtual image 880. The processor 120 or the server 108 may determine a final height Ln having the smallest difference between feature vectors while changing the height of a target building at specified intervals.

The processor 120 or the server 108 may update the 3D virtual map 810 with the target building 808*b* having the final height Ln.

Figure 9:
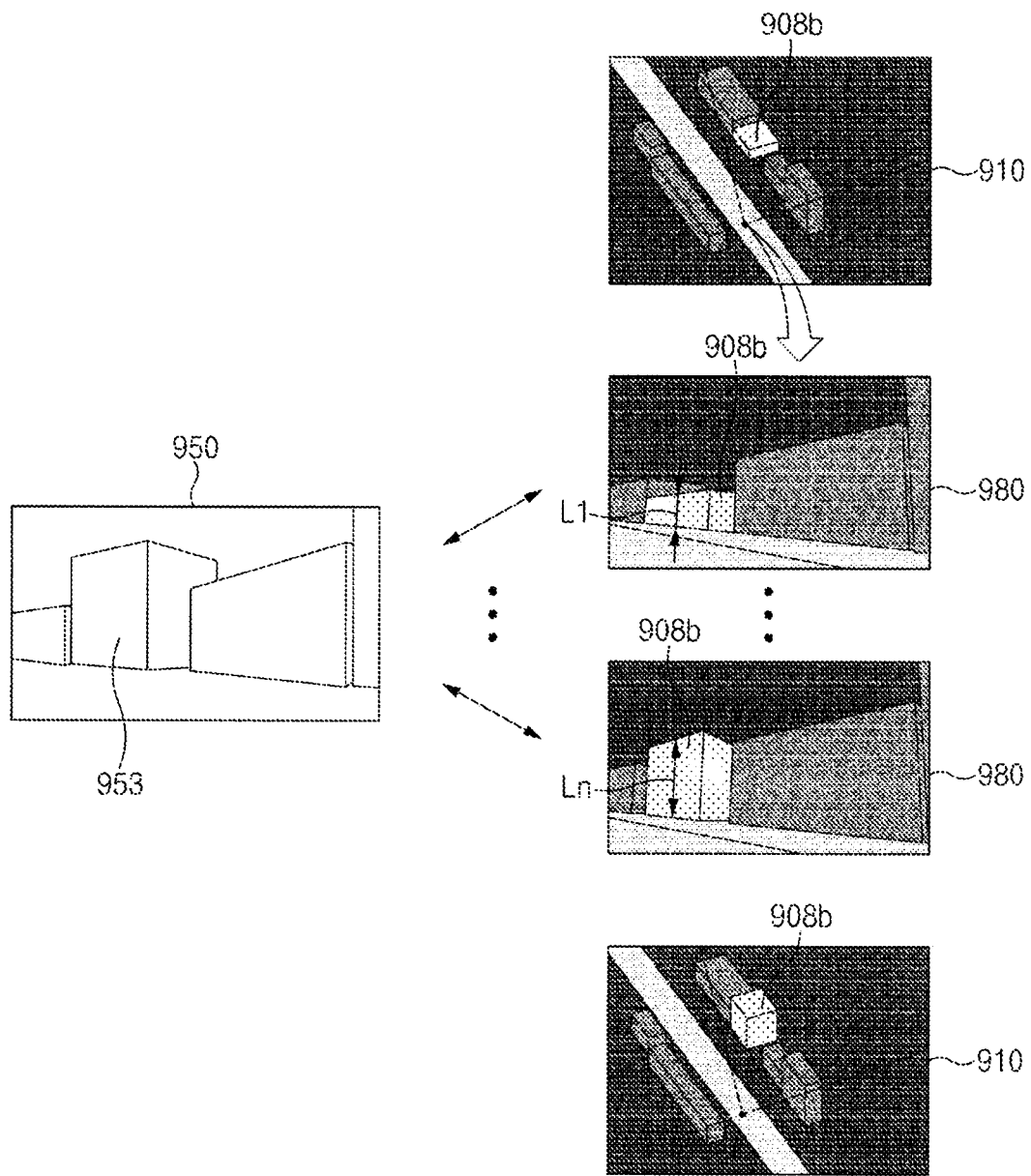
FIG. 9 is a diagram illustrating an update when the heights of a virtual building are different according to an embodiment of the disclosure.

FIG. 9 is a diagram illustrating an update when the heights of a virtual building are different according to an embodiment of the disclosure.

Referring to FIG. 9, the processor 120 or the server 108 may update the height of a virtual building 908*b*, which is different from the height of a real building area 953.

The processor 120 or the server 108 may obtain a real image 950 including the real building area 953 corresponding to the virtual building 908*b*. Through the matching process, the processor 120 or the server 108 may determine the virtual building 908*b* corresponding to the real building area 953 as a target building (e.g., a virtual building having a matching reference value or less) which is required to be updated.

According to various embodiments, the processor 120 or the server 108 may generate a virtual image 980 by reflecting a height L1 of the virtual building 908*b* set onto a 3D virtual map 910. The processor 120 or the server 108 may compare a feature vector of the real image 950 and a feature vector of the virtual image 980. The processor 120 or the server 108 may determine a final height Ln having the smallest difference between feature vectors while changing the height of the target building at specified intervals. The processor 120 or the server 108 may update the 3D virtual map 910 with the target building 908*b* having the final height Ln.

FIG. 10 is a diagram illustrating a text-type database of a 3D virtual map according to an embodiment of the disclosure.

Referring to FIG. 10, a 3D virtual map may be generated based on a text-type database (hereinafter, referred to as a text DB) 1010. For example, the text DB 1010 may store information about each building, such as a first address (e.g., district name) A4, a second address (e.g., street number) A5, a building height A16, and a base date A22, building ID (e.g., unique number) A19, or building section coordinates (geometry), in a text form.

According to various embodiments, when the text DB 1010 is updated, the processor 120 or the server 108 may deliver the text DB 1010 to other devices around the updated area.

According to an embodiment, the server 108 may receive update information 1020 from a plurality of terminals. For example, the update information 1020 may include data on a building ID, a device ID (or user ID), an update height (e.g., in meters), and an update type (e.g., automatic update or update by user input).

The server 108 may receive the update information 1020 from each of the terminals equal to or greater than the specified number, and when similar update heights are accumulated over the specified number, the height field A16 of the text DB 1010 may be updated with the average value of the update heights.

Figure 11:
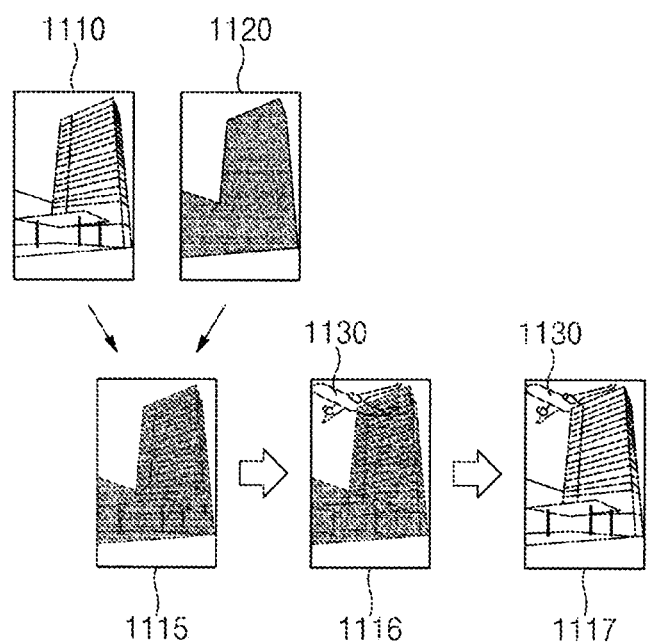
FIG. 11 is a diagram illustrating the execution of an AR application according to an embodiment of the disclosure.

FIG. 11 is a diagram illustrating the execution of an AR application according to an embodiment of the disclosure.

FIG. 11 is illustrative and the embodiment is not limited thereto.

Referring to FIG. 11, the processor 120 may execute an AR application. The processor 120 may provide an AR service by using a real image 1110 and a virtual image 1120 obtained based on the same location and direction on the 3D virtual map. According to an embodiment, the virtual image 1120 is not limited to image-type data. For example, the virtual image 1120 may be text-type data including building-related information (e.g., building area, building shape and building edge information).

For example, the real image 1110 and the virtual image 1120 may overlap in 1115, an AR object 1130 may be arranged in 1116, and the AR object 1130 may not be displaced in the area where the real building and the virtual building overlap in 1117. When the heights of the real building and the virtual building are the same or similar, an error may not occur in displaying the AR object 1130.

Figure 12:
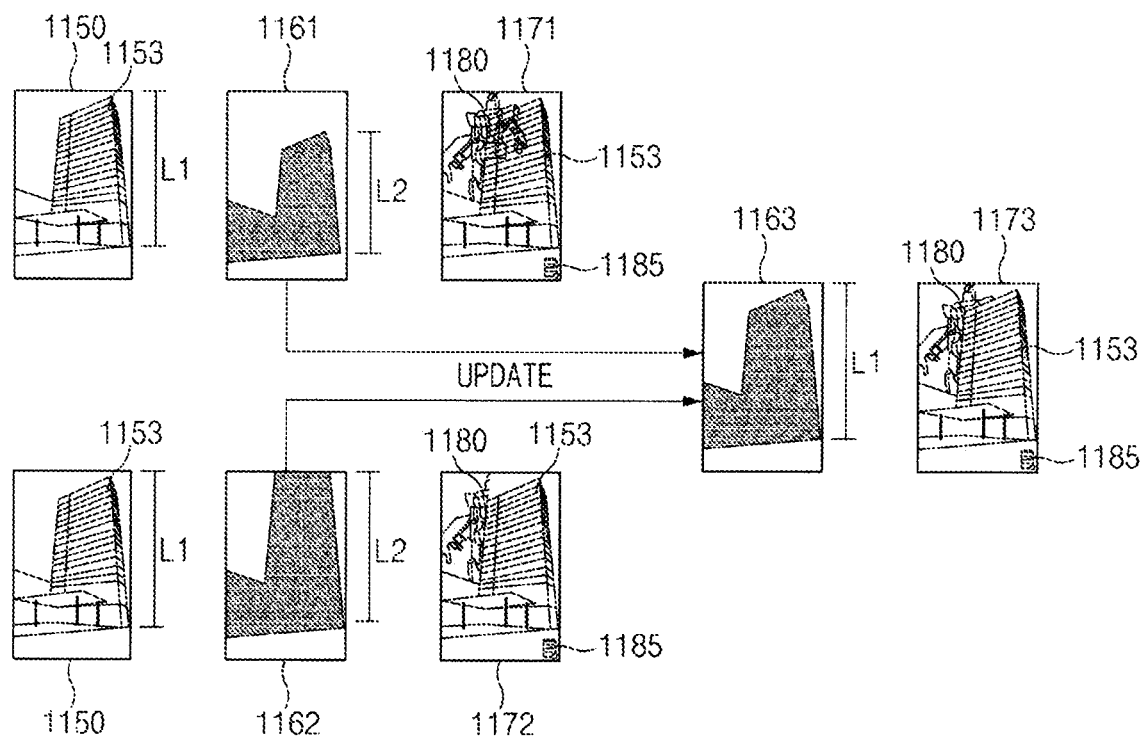
FIG. 12 is a diagram illustrating a process of improving an error in the execution process of an AR application according to an embodiment of the disclosure.

FIG. 12 is a diagram illustrating a process of improving an error in the execution process of an AR application according to an embodiment of the disclosure.

FIG. 12 illustrates a case in which height data of a real building differs from height data of a virtual building, but is not limited thereto.

Referring to FIG. 12, the processor 120 may execute an AR application. The processor 120 may provide an AR service by using a real image 1150 and virtual images 1161 and 1162 obtained based on the same location and direction on the 3D virtual map. According to an embodiment, the virtual images 1161 and 1162 are not limited to image-type data. For example, the virtual images 1161 and 1162 may be text-type data including building-related information (e.g., building area, building shape and building edge information).

For example, when the height of a real building 1153 in the real image 1150 is L1 and the height of the virtual building corresponding to the real building 1153 in a first virtual image 1161 is L2 smaller than L1, an AR object 1180 may be displayed in a form that covers a part of the real building 1153. Accordingly, in an output image 1171, a part of the AR object 1180 may be displayed in front of the real building 1153, and another part may be arranged behind the real building 1153, so that an error occurs in a perspective effect.

For another example, when the height of the real building 1153 in the real image 1150 is L1 and the height of the virtual building in a second virtual image 1162 is L3 greater than L1, in an output image 1172, an error may occur in which a part of the AR object 1180 is covered in the sky area where the real building 1153 is not present.

The processor 120 or the server 108 may update the height of the virtual building in the first virtual image 1161 or the second virtual image 1162 by reflecting the real image 1150. Accordingly, the processor 120 or the server 108 may generate an updated third virtual image 1163. The processor 120 or the server 108 may generate an output image 1173 by using the third virtual image 1163. In the output image 1173, the AR object 1180 may be hidden in the area where the real building 1153 is placed, and the AR object 1180 may be displayed in another area to provide a perspective effect in which a robot is placed behind the building.

According to various embodiments, the processor 120 may display a manual update button 1185 in the output images 1171, 1172 and 1173. When an error occurs while the AR application operates, the user may press the manual update button 1185 to request an update of the surrounding buildings.

The processor 120 or the server 108 may update surrounding buildings in response to a user input and then provide an AR service to another user when the AR application is executed or based on the updated 3D virtual map.

According to various embodiments, an electronic device (e.g., the electronic device 101 of FIG. 1) may include a camera module (e.g., the camera module 180 of FIG. 1), a communication circuit (e.g., the communication module 190 of FIG. 1), a memory (e.g., the memory 130 of FIG. 1), and a processor (e.g., the processor 120 of FIG. 1), where the processor may execute a first application using the camera module (e.g., the camera module 180 of FIG. 1), obtain a first image through the camera module (e.g., the camera module 180 of FIG. 1) while the first application operates, recognize an object of a specified type in the first image, obtain location information of where the first image is obtained, determine a first virtual point corresponding to the location information on a three-dimensional (3D) virtual map, obtain a second image corresponding to the first image at the first virtual point, and update data of the 3D virtual map on the object based on a comparison between the first image and the second image.

According to various embodiments, the processor (e.g., the processor 120 of FIG. 1) may receive a user input related to consent to use of the first image through an execution screen of the first application, and update the data by using the first image in response to the user input.

According to various embodiments, the processor (e.g., the processor 120 of FIG. 1) may identify a first update condition for an object matched in the first image and the second image, and update the data when the first update condition is satisfied.

According to various embodiments, the first update condition may include a condition in which a ratio of a number of matched virtual objects in the first image to a number of virtual objects observable at the first virtual point is greater than or equal to a specified first reference value.

According to various embodiments, the processor (e.g., the processor 120 of FIG. 1) may recognize a first text in the first image, extract a second text from the 3D virtual map, identify a second update condition related to a matching ratio between the first text and the second text, and update the data when the second update condition is satisfied.

According to various embodiments, the first text and the second text may be address-type data.

According to various embodiments, the processor (e.g., the processor 120 of FIG. 1) may determine a second virtual area corresponding to an arrangement area of the recognized object on the 3D virtual map based on a comparison between the first image and the second image.

According to various embodiments, the processor (e.g., the processor 120 of FIG. 1) may determine a cross-sectional shape by using the first image when the cross-sectional shape of the second virtual area is not stored in the data of the 3D virtual map.

According to various embodiments, the processor (e.g., the processor 120 of FIG. 1) may determine the data by comparing a first feature vector of the first image with a second feature vector of the second image.

According to various embodiments, the processor (e.g., the processor 120 of FIG. 1) may determine the data such that a similarity between the first feature vector and the second feature vector is maximized.

According to various embodiments, the object of the specified type may include a building, and the data may include a height of the building.

According to various embodiments, the processor (e.g., the processor 120 of FIG. 1) may store the data of the 3D virtual map as a text type database in the memory (e.g., the memory 130 of FIG. 1).

According to various embodiments, the processor (e.g., the processor 120 of FIG. 1) may display a user interface of requesting an update of the data on at least a portion of an execution screen of the first application.

According to various embodiments, the processor (e.g., the processor 120 of FIG. 1) may obtain the second image by disposing a virtual camera having same setting information as that of the camera module (e.g., the camera module 180 of FIG. 1) at the first virtual point.

According to various embodiments, the processor (e.g., the processor 120 of FIG. 1) may transmit the location information to an external server, and receive a text-type database of the 3D virtual map from the external server.

According to various embodiments, a method for updating a map, which is performed by an electronic device (e.g., the electronic device 101 of FIG. 1), may include executing a first application by using a camera module (e.g., the camera module 180 of FIG. 1) of the electronic device (e.g., the electronic device 101 of FIG. 1), obtaining a first image through the camera module (e.g., the camera module 180 of FIG. 1) while the first application operates, recognizing an object of a specified type in the first image, obtaining information on a location where the first image is photographed, determining a first virtual point corresponding to the location information on a 3D virtual map, obtaining a second image corresponding to the first image at the first virtual point, and updating data of the 3D virtual map on the object based on a comparison between the first image and the second image.

According to various embodiments, the updating of the data may include receiving a user input related to consent to use of the first image through an execution screen of the first application.

According to various embodiments, the updating of the data may include identifying a first update condition for an object matched in the first image and the second image, and updating the data when the first update condition is satisfied.

According to various embodiments, the first update condition may include a condition in which a ratio of a number of matched virtual objects in the first image to a number of virtual objects observable at the first virtual point is greater than or equal to a specified first reference value.

According to various embodiments, the updating of the data may include recognizing a first text in the first image, extracting a second text from the 3D virtual map, identifying a second update condition related to a matching ratio between the first text and the second text, and updating the data when the second update condition is satisfied.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a camera module;
   a communication circuit;
   a memory; and
   a processor,
   wherein the processor is configured to:
   execute a first application using the camera module,
   obtain a first image through the camera module while the first application operates,
   recognize an object of a specified type in the first image,
   obtain location information of where the first image is obtained,
   determine a first virtual point corresponding to the location information on a three-dimensional (3D) virtual map,
   obtain a second image corresponding to the first image at the first virtual point,
   update data of the 3D virtual map on the object based on a comparison between the first image and the second image, and determine an area where the object is placed on the 3D virtual map, based on the comparison between the first image and the second image.

2. The electronic device of claim 1, wherein the processor is further configured to:
receive a user input related to consent to use of the first image through an execution screen of the first application, and
update the data by using the first image in response to the user input.

3. The electronic device of claim 1, wherein the processor is further configured to:
identify a first update condition for an object matched in the first image and the second image, and
update the data when the first update condition is satisfied.

4. The electronic device of claim 3, wherein the first update condition includes a condition in which a ratio of a number of matched virtual objects in the first image to a number of virtual objects observable at the first virtual point is greater than or equal to a specified first reference value.

5. The electronic device of claim 1, wherein the processor is further configured to:
recognize a first text in the first image,
extract a second text from the 3D virtual map,
identify a second update condition related to a matching ratio between the first text and the second text, and
update the data when the second update condition is satisfied.

6. The electronic device of claim 1, wherein the processor is further configured to:
when a shape of the area is not stored in the data of the 3D virtual map, determine the shape of the area by using the first image.

7. The electronic device of claim 1, wherein the processor is further configured to:
determine the data by comparing a first feature vector of the first image with a second feature vector of the second image.

8. The electronic device of claim 7, wherein the processor is further configured to:
determine the data such that a similarity between the first feature vector and the second feature vector is maximized.

9. The electronic device of claim 1,
wherein the object of the specified type includes a building, and
wherein the data includes a height of the building.

10. The electronic device of claim 1, wherein the processor is further configured to:
store the data of the 3D virtual map as a text type database in the memory.

11. The electronic device of claim 1, wherein the processor is further configured to:
display a user interface of requesting an update of the data on at least a portion of an execution screen of the first application.

12. The electronic device of claim 1, wherein the processor is further configured to:
obtain the second image by disposing a virtual camera having same setting information as setting information of the camera module at the first virtual point.

13. The electronic device of claim 1, wherein the processor is further configured to:
transmit the location information to an external server, and
receive a text-type database of the 3D virtual map from the external server.

14. A method for updating a three-dimensional (3D) virtual map performed by an electronic device, the method comprising:
executing a first application by using a camera module of the electronic device;
obtaining a first image through the camera module while the first application operates;
recognizing an object of a specified type in the first image;
obtaining location information of where the first image is obtained;
determining a first virtual point corresponding to the location information on a 3D virtual map;
obtaining a second image corresponding to the first image at the first virtual point;
updating data of the 3D virtual map on the object based on a comparison between the first image and the second image; and
determining an area where the object is placed on the 3D virtual map, based on the comparison between the first image and the second image.

15. The method of claim 14, further comprising:
receiving a user input related to consent to use of the first image through an execution screen of the first application, and
updating the data by using the first image in response to the user input.

16. The method of claim 14, further comprising:
identifying a first update condition for an object matched in the first image and the second image, and
updating the data when the first update condition is satisfied.

17. The method of claim 14, further comprising:
recognizing a first text in the first image,
extracting a second text from the 3D virtual map,
identifying a second update condition related to a matching ratio between the first text and the second text, and
updating the data when the second update condition is satisfied.

18. The method of claim 14, further comprising:
when a shape of the area is not stored in the data of the 3D virtual map, determining the shape of the area by using the first image.

19. The method of claim 14, wherein the object of the specified type includes a building, and
wherein the data includes a height of the building.

* * * * *